United States Patent
Bernstein et al.

(10) Patent No.: US 9,626,624 B2
(45) Date of Patent: Apr. 18, 2017

(54) PROGRAMMABLE PROBABILITY PROCESSING

(75) Inventors: Jeffrey Bernstein, Middleton, MA (US); Benjamin Vigoda, Winchester, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 508 days.

(21) Appl. No.: 13/187,466

(22) Filed: Jul. 20, 2011

(65) Prior Publication Data

US 2014/0114443 A1 Apr. 24, 2014

Related U.S. Application Data

(60) Provisional application No. 61/366,061, filed on Jul. 20, 2010, provisional application No. 61/380,964, (Continued)

(51) Int. Cl.
*G06N 5/04* (2006.01)
*G06N 3/063* (2006.01)

(52) U.S. Cl.
CPC ............. *G06N 5/04* (2013.01); *G06N 3/0635* (2013.01)

(58) Field of Classification Search
None
See application file for complete search history.

(56) References Cited

U.S. PATENT DOCUMENTS 5,297,232 A 3/1994 Murphy
5,369,749 A 11/1994 Baker et al.
(Continued)

FOREIGN PATENT DOCUMENTS

CN 10105979 A 10/2007
WO 2012/170679 6/2012

OTHER PUBLICATIONS

Paskin, Mark, Carlos Guestrin, and Jim McFadden. "A robust architecture for distributed inference in sensor networks." Proceedings of the 4th international symposium on Information processing in sensor networks. IEEE Press, 2005.*
(Continued)

*Primary Examiner* — Kakali Chaki
*Assistant Examiner* — Daniel Pellett
(74) *Attorney, Agent, or Firm* — Patent Capital Group

(57) ABSTRACT

An inference task is performed using a computation device having a plurality of processing elements operable in parallel and connected via a connectivity system. Performing the task includes accepting at the device a specification of at least part of the inference task. The specification characterizes a plurality of variables and a plurality of factors, each factor being associated with a subset of the variables. Each of the processing elements is configured with data defining one or more of the plurality of factors. At each of the processing elements, computation associated with one of the factors is performed concurrently with other of the processing elements performing computation associated with different ones of the factors. Messages are exchanged via a connectivity system. The messages provide inputs and/or outputs to the processing elements for the computations associated with the factors and provide a result of performing of the at least the part of the inference task.

26 Claims, 11 Drawing Sheets

Related U.S. Application Data filed on Sep. 8, 2010, provisional application No. 61/494,311, filed on Jun. 7, 2011.

(56) References Cited

U.S. PATENT DOCUMENTS

| | | | |
|---|---|---|---|
| 5,621,896 | A | 4/1997 | Burgess et al. |
| 6,073,185 | A | 6/2000 | Meeker |
| 7,299,339 | B2 * | 11/2007 | Ramesh .......................... 712/24 |
| 7,580,404 | B2 * | 8/2009 | Thiele et al. ................. 370/380 |
| 8,458,114 | B2 | 6/2013 | Vigoda et al. |
| 8,914,618 | B2 | 12/2014 | Wang et al. |
| 2006/0075206 | A1 | 4/2006 | Bouchard et al. |
| 2010/0161533 | A1 | 6/2010 | Snook et al. |
| 2010/0223225 | A1 | 9/2010 | Vigoda et al. |
| 2012/0317065 | A1 | 12/2012 | Bernstein et al. |

OTHER PUBLICATIONS

Loeliger, H-A. "An Introduction to Factor Graphs." Signal Processing Magazine, IEEE 21.1 (2004): 28-41.*
Newman, David, et al. "Distributed inference for latent dirichlet allocation." Advances in Neural Information Processing Systems. 2007.*
Guestrin, Stanislav Funiak Carlos, Mark Paskin, and Rahul Sukthankar. "Distributed inference in dynamical systems." Advances in Neural Information Processing Systems: Proceedings of the 2006 Conference. vol. 19. The MIT Press, 2007.*
Gonzalez, Joseph E., et al. "Distributed parallel inference on large factor graphs." Proceedings of the Twenty-Fifth Conference on Uncertainty in Artificial Intelligence. AUAI Press, 2009.*
Keckler, Stephen W., et al. "Exploiting fine-grain thread level parallelism on the MIT multi-ALU processor." ACM SIGARCH Computer Architecture News. vol. 26. No. 3. IEEE Computer Society, 1998.*
Kschischang, Frank R., Brendan J. Frey, and H-A. Loeliger. "Factor graphs and the sum-product algorithm." Information Theory, IEEE Transactions on 47.2 (2001): 498-519.*
Wymeersch, Henk. Iterative receiver design. Chapters 4 and 5 vol. 234. Cambridge: Cambridge University Press, 2007.*
Chu, Cheng, et al. "Map-reduce for machine learning on multicore." Advances in neural information processing systems 19 (2007): 281.*
Sanders, Peter. "Randomized static load balancing for tree-shaped computations." Workshop on Parallel Processing. 1994.*
Gonzalez, Joseph, Yucheng Low, and Carlos Guestrin. "Residual splash for optimally parallelizing belief propagation." International Conference on Artificial Intelligence and Statistics. 2009.*
Rapley, A., et al. "Stochastic iterative decoding on factor graphs." Proc. 3rd Int. Symp. Turbo Codes Related Topics. 2003.*
Bobda, Christophe, and Ali Ahmadinia. "Dynamic interconnection of reconfigurable modules on reconfigurable devices." Design & Test of Computers, IEEE 22.5 (2005): 443-451.*
Estrin, Gerald. "Reconfigurable computer origins: the UCLA fixed-plus-variable (F+V) structure computer." IEEE Annals of the History of Computing 24.4 (2002): 3-9.*
Vassiliadis, Stamatis, and Ioannis Sourdis. "Reconfigurable fabric interconnects." System-on-Chip, 2006. International Symposium on. IEEE, 2006.*
Karypis, George, and Vipin Kumar. "Parallel multilevel series k-way partitioning scheme for irregular graphs." Siam Review 41.2 (1999): 278-300.*
Vigoda, Benjamin, Analog Logic: Programmable, Continuous.
Boser et al., "An Analog Neural Network Processor with Programmable Topology," IEEE Journal of Solid.
Korean Language—1st Office Action issued in Korean Patent Application Serial No. 10-2014-7000431 mailed Jun. 22, 2015, 7 pages.
English Language—Summary of 1$^{st}$ Office Action issued in Korean Patent Appl. Serial No. 10-2014-7000431 mailed Jun. 22, 2015, 2 pages.
Non-Final Office Action in U.S. Appl. No. 13/491,212 mailed Jul. 16, 2015, 55 pages.
CN OA1 issued in CN Patent Application Serial No. 201280034859.9 mailed Dec. 14, 2015, 8 pages.
English Summary of CN OA1 issued in CN Patent Application Serial No. 201280034859.9 mailed Dec. 14, 2015, 1 page.
Korean Language—2nd Office Action issued in Korean Patent Application Serial No. 10-2014-7000431 mailed Dec. 30, 2015, 8 pages.
English Translated—2nd Office Action issued in Korean Patent Application Serial No. 10-2014-7000431 mailed Dec. 30, 2015, 8 pages.
Final Office Action in U.S. Appl. No. 13/491,212 mailed Feb. 12, 2016, 35 pages.
U.S. Appl. No. 61/494,311, filed Jun. 7, 2011.
U.S. Appl. No. 61/494,318, filed Jun. 7, 2012.
U.S. Appl. No. 13/491,212, filed Jun. 7, 2012.
PCT Patent Application Serial No. PCT/US2012/041341 filed Jun. 7, 2012.
PCT Search Report and Written Opinion issued for PCT Patent Application Serial No. PCT/US2012/041341 mailed Oct. 16, 2012, 95 pages.
Korean Patent Application Serial No. 10-2014-7000431 filed Jan. 7, 2014.
Gonzalez et al., "Distributed Parallel Inference on Large Factor Graphs," UAI, pp. 203-212 (2009) http:!Larxiv.org/ftpLarvixLpapcrsL1205[1205.2645.pdf [online: Oct. 5, 2012]) XP55040184.
Lemon, Sumner, "Chip Startup Developing Probability Processor", www.pcworld.com/article.203541/article.html, Aug. 18, 2010, 1 page.
Adar, Rivka et al., "Stochastic Computing With Biomolecular Automata", www.pnas.org/cgi/doi/10.1073/pnas.0400731101, 9960-9965, PNAS, Jul. 6, 2004, vol. 101, No. 27, 6 pages.
Final Office Action in U.S. Appl. No. 13/491,212 mailed Jun. 7, 2012, 35 pages.
Non-Final Office Action in U.S. Appl. No. 13/491,212 mailed Jun. 17, 2016, 13 pages.
Notice of Allowance issued in U.S. Appl. No. 13/491,212 mailed Sep. 30, 2016, 8 pages.
English Allowed Claims re Notice of Allowance issued in CN Patent Application Serial No. 2012800034589.3 mailed Aug. 5, 2016, 7 pages.

* cited by examiner

```
100     for all a do l̄_A(a) ← MAXVALUE;
101     for all b do l̄_B(b) ← MAXVALUE;
102     for all c do l̄_C(c) ← MAXVALUE;
103
104     for i = 1,...,‖W‖
105     {
106         l̃_A ← W(a_i,b_i,c_i) + l̄_B(b_i) + l̄_C(c_i)
107         l̃_B ← W(a_i,b_i,c_i) + l̄_A(a_i) + l̄_C(c_i)
108         l̃_C ← W(a_i,b_i,c_i) + l̄_A(a_i) + l̄_B(b_i)
109         l̄_A ← min(l̄_A, l̃_A)
110         l̄_B ← min(l̄_B, l̃_B)
111         l̄_C ← min(l̄_C, l̃_C)
112     }
```

FIG. 5

PROGRAMMABLE PROBABILITY PROCESSING

CROSS-REFERENCE TO RELATED APPLICATIONS

This application claims the benefit of and incorporates by reference each of the following:

U.S. Provisional Application No. 61/366,061, titled "PROGRAMMABLE PROBABILITY PROCESSING PLATFORM WITH RECONFIGURABLE CONNECTIVITY FABRIC," filed Jul. 20, 2010.

U.S. Provisional Application No. 61/380,964, titled "RECONFIGURABLE ANALOG PROCESSING," filed Sep. 8, 2010.

U.S. Provisional Application No. 61/494,311, titled "ACCELERATING INFERENCE COMPUTATION," filed Jun. 7, 2011.

STATEMENT AS TO FEDERALLY SPONSORED RESEARCH

This invention was made with government support under FA8750-07-C-0231 awarded by the Defense Advanced Research Projects Agency (DARPA). The government has certain rights in the invention.

BACKGROUND

This invention relates to programmable probability processing.

One approach to inference-based computation (e.g., Belief Propagation, BP) makes use of factor graphs, for instance, as described in Loeliger, "Introduction to Factor Graphs," *IEEE Signal Processing Magazine*, Jan. 2004. One graph-based inference approach is the Sum-Products (SP) approach, as described in the referenced paper. Another approach is the Min-Sum (MS) approach (also referred to as Max-Sum or Max-Product), which can be regarded as an approximation of the SP approach. A description of such algorithms may be found in H. Wymeersch, *Iterative Receiver Design*, Cambridge University Press, Cambridge, 2007.

Referring to FIG. 1, an example of a portion of a factor graph 100 includes factor nodes 110-111 and variable nodes 121-123. Factor node 110 implements a factor (e.g., a constraint) that depends on the variables A, B, and C associated with variable nodes 121-123, respectively. In the SP approach, the factor node 110 receives messages from the adjacent variable nodes, and uses those messages to compute and emit output messages back to the variable nodes. In the SP approach, we use the notation $\vec{\mu}_A$ (or more explicitly $\vec{\mu}_{A \to F}$) to represent the message from the variable node 121 associated with variable A to factor node 110 associated with factor F. Similarly, the message passing back to the variable node is represented as $\vec{\mu}_A$ (or more explicitly $\vec{\mu}_{A \leftarrow F}$. For the factor graph shown in FIG. 1, the messages for factor node 110 are computed as follows:

$$\vec{\mu}_C(c) = \sum_{a,b} w(a, b, c) \vec{\mu}_A(a) \vec{\mu}_B(b) \tag{1a}$$

$$\vec{\mu}_B(b) = \sum_{a,c} w(a, b, c) \vec{\mu}_A(a) \vec{\mu}_C(c) \tag{1b}$$

$$\vec{\mu}_A(a) = \sum_{b,c} w(a, b, c) \vec{\mu}_B(a) \vec{\mu}_C(c) \tag{1c}$$

The weights w(a, b, c) represent the factor, for example, as a probability distribution with all the values adding up to 1.0, of as another form of distribution, or as 0/1 indicator values.

In the Max-Product approach, the summations are effectively replaced with max operations. The Min-Sum approach is effectively a logarithmic version of the Max-Product approach. The messages represent logarithmic messages, for instance, defined as $\vec{T}_A \equiv -\log(\vec{\mu}_A)$ (taking the logarithm element-wise). Similarly, the weights are defined as $W(a,b,c) = -\log w(a,b,c)$. For the MS approach, the messages are computed as follows:

$$\vec{T}_C(c) = \min_{a,b}(W(a,b,c) + \vec{T}_A(a) + \vec{T}_B(b)) \tag{2a}$$

$$\vec{T}_B(b) = \min_{a,c}(W(a,b,c) + \vec{T}_A(a) + \vec{T}_C(c)) \tag{2b}$$

$$\vec{T}_A(a) = \min_{b,c}(W(a,b,c) + \vec{T}_B(b) + \vec{T}_C(c)) \tag{2c}$$

In the discussion below, we use the notation |A| to represent the number of values that the variable A can take on. In this notation, the number of terms in the sum for $\vec{\mu}_C(c)$ is |A|×|B|. For instance, if each variable can take on one of 64 values, there are 4096 terms in the sum or min, which must be computed for each of the 64 output values, for a total of over 0.78 million terms to compute three output messages.

There is a need to accelerate computation of the messages for the purpose of accelerating inference computation, for example, based on factor graphs.

SUMMARY

In one aspect, in general, a programmable computation device, which is for performing an inference task specified by a plurality of variables and a plurality of factors, each factor being associated with a subset of the variables, includes a plurality of processing elements operable in parallel, a connectivity system coupled to each of the processing elements, and a controller having an interface for a host system for accepting a specification of at least part of the inference task, and being coupled to the processing elements via the connectivity system. Each of the processing elements is configurable by the controller to perform a computation associated with one of the factors concurrently with other of the processing elements performing computation associated with different ones of the factors. Each of the plurality of processing elements is coupled to the connectivity system to exchange messages via the connectivity system. The messages provide inputs and/or outputs to the computations associated with the factors and providing to the controller a result of performing of the at least part of the inference task.

Aspects can include one or more of the following features.

The specification of the inference task comprises a specification of a graph-based inference task, and each factor is associated with an element of a graph.

The connectivity system is configurable to provide connectivity between processing elements according to the graph.

The connectivity system provides at least one of a grid, a tree, and a chain connectivity between the processing elements.

Each processing element comprises a storage for a definition of a factor, and a storage for data associated with the inputs and/or outputs of the computations.

Each processing element includes one or more computation units for performing a succession of parts of the computation associated with a factor defined by data in the storage for the definition of the factor.

Each computation unit comprises a combination unit for combining values accessed from the storage for the data associated with the inputs and/or outputs.

The combination unit comprises numeric computation logic.

The combination unit comprises analog computation circuitry.

Each computation unit further comprises an accumulation unit for accumulating an output of the combination unit into values in said storage.

Each processing element comprises a plurality of the computation units.

Each of the computation units has a separate part of the storage for the data associated with the inputs and/or outputs.

The storage for the definition of the factor is shared by the computation units.

In another aspect, in general, a method is directed to performing an inference task using a computation device having a plurality of processing elements operable in parallel and connected via a connectivity system. The method includes accepting at the device a specification of at least part of the inference task. The specification characterizes a plurality of variables and a plurality of factors, each factor being associated with a subset of the variables. Each of the processing elements is configured with data defining one or more of the plurality of factors. At each of the processing elements, computation associated with one of the factors is performed concurrently with other of the processing elements performing computation associated with different ones of the factors. Messages are exchanged via a connectivity system. The messages provide inputs and/or outputs to the processing elements for the computations associated with the factors and provide a result of performing of the at least the part of the inference task.

Aspects can include one or more of the following:

Accepting the specification of the at least part of the inference task includes accepting said specification from a host at a controller of the device, and the method further comprises passing the result of the performing of the at least part of the inference task via the controller to the host.

The specification of the inference task comprises specification of a graph-based inference task, and each factor is associated with an element of a graph.

The inference task comprises a Belief Propagation task.

The messages represent probability distributions of the variables.

The method further comprises configuring the connectivity system is to provide connectivity between processing elements according to the graph.

The method further comprises configuring the connectivity system according to a result of a computation performed using the device.

The method further comprises providing at least one of a grid, a tree, and a chain connectivity between the processing elements via the connectivity system.

Each processing element comprises a storage for a definition of factor, and a storage for data associated with the inputs and/or outputs of the computations Configuring each of the processing elements with data defining one or more of the plurality of factors includes storing said data in the storage for the definition of a factor.

Each processing element includes one or more computation units.

Performing the computation associated with one of the factors includes performing using the computation units a succession of parts of the computation associated with a factor defined by data in the storage for the definition of the factor.

Each computation unit comprises a combination unit.

Performing the computation associated with one of the factors includes combining values accessed from the storage for the data associated with the inputs and/or outputs.

The combination unit comprises numeric computation logic used in performing the succession of parts of the computation.

The combination unit comprises analog computation circuitry used in performing the succession of parts of the computation.

Each computation unit further comprises an accumulation unit.

Performing the computation associated with one of the factors includes accumulating an output of the combination unit into values in the storage for data associated with the inputs and/or outputs of the computations.

Each processing element comprises a plurality of the computation units and performing the succession of parts of the computation includes performing said parts concurrently on multiple of the computation units.

In another aspect, in general, an apparatus for solving inference problems includes a programmable probability processing platform having a plurality of identical processing elements configured to operate in parallel. The processing elements being interconnected by a reconfigurable connectivity fabric.

In another aspect, in general, a method of solving inference problems includes solving a first inference problem on a programmable probability processing platform having a plurality of identical processing elements configured to operate in parallel and interconnected by a connectivity fabric having a first configuration; reconfiguring the connectivity fabric to have a second configuration, and solving a second inference problem on said programmable probability processing platform using the second configuration.

Other features and advantages of the invention are apparent from the following description, and from the claims.

DESCRIPTION OF DRAWINGS

FIG. 5 is a pseudocode listing.

DESCRIPTION

1 Overview

Figure 2:
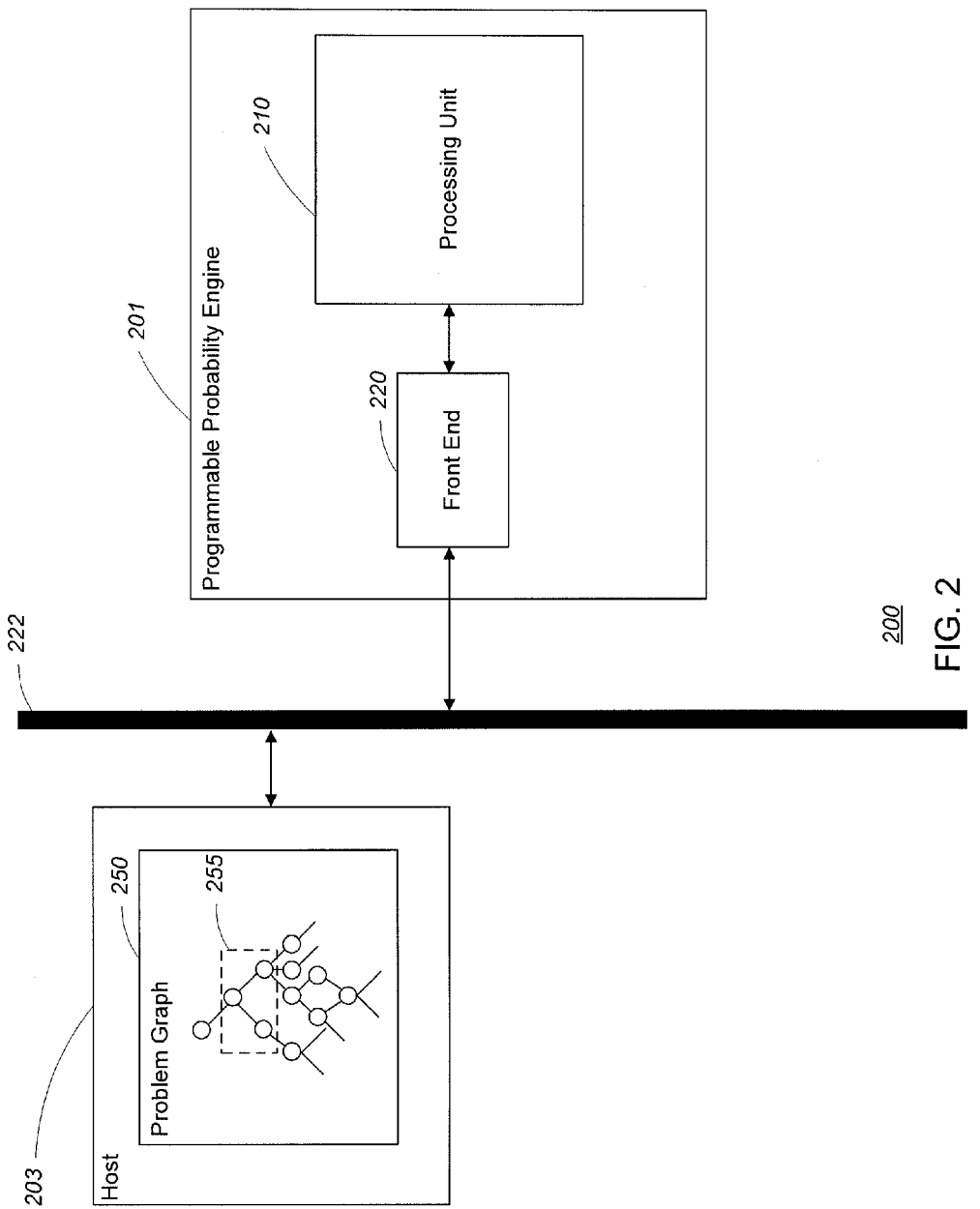
FIG. 2 is a system including a programmable probability engine.

Referring to FIG. 2, a reconfigurable processing system 200 includes a host system 203 (e.g., a conventional digital computer) which is connected via a data bus 222 to a programmable probability engine 201. The programmable probability engine 201 includes a processing unit 210 and a front end (e.g., a digital controller implemented on a field programmable gate array (FPGA)) 220, which is coupled to the bus 222, providing a means of communication between the processing unit 210 and the host system 203.

The probability engine 201 is programmable to implement various types of probability based processing, and in particular, is programmable to implement inference graphs (e.g., factor graphs), for instance to solve Bayesian inference problems. In an example of such a use, a specification of a factor graph 250 is created on the host system 203 and all or part of the graph specification 250 is passed to the probability engine 201 from the host system 203. In some examples, the graph is specified using an approach described in the co-pending application titled "*DESIGN AND IMPLEMENTATION OF FACTOR GRAPHS*," U.S. patent application Ser. No. 13/006,060, filed Jan. 1, 2011, which is incorporated by reference.

In some examples, the probability engine 201 includes an analog processing unit 210 which is configurable to solve the graph 250, while in other embodiments digital numeric processing is used, or a combination of analog and numeric processing is used. It should also be understood that the graph 250 is not necessarily implemented and operated on as a whole by the processing unit 210. Rather, depending on the configuration of the processing unit 210, various portions (e.g., portion 255) of the graph 250 can be processed at different times and/or on different subsets of the processing unit 210 as is described in a later section.

2 Single Probability Processor Element

Figure 3:
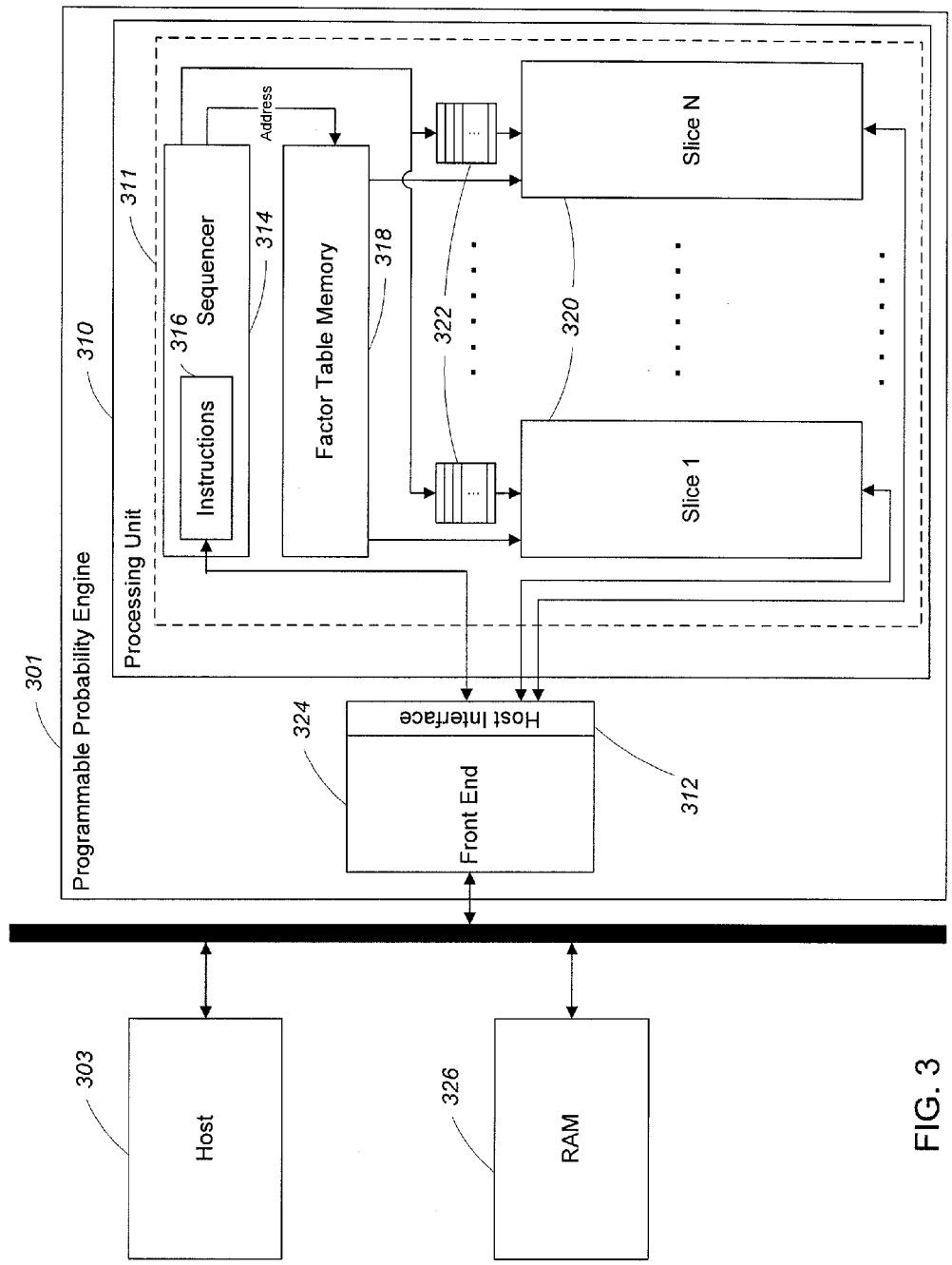
FIG. 3 is a system including a single probability processor element.

Referring to FIG. 3, one embodiment of a reconfigurable processing system 300 includes an processing unit 310 which includes a single probability processor element 311. In general, the probability processor element 311 is a special purpose processor specifically designed to perform computation for the Min-Sum or Sum-Product algorithm on individual factors in a factor graph. The probability processor element 311 is programmable in that it can perform this computation for an arbitrary factor over discrete variables.

The probability processor element 311 includes a sequencer 314 including an instruction memory 316, a factor table memory 318, N computation units (referred to herein as slices) 320, and N first-in-first-out (FIFO) micro-instruction queues 322 each corresponding to one of the N slices 320.

Figure 1:
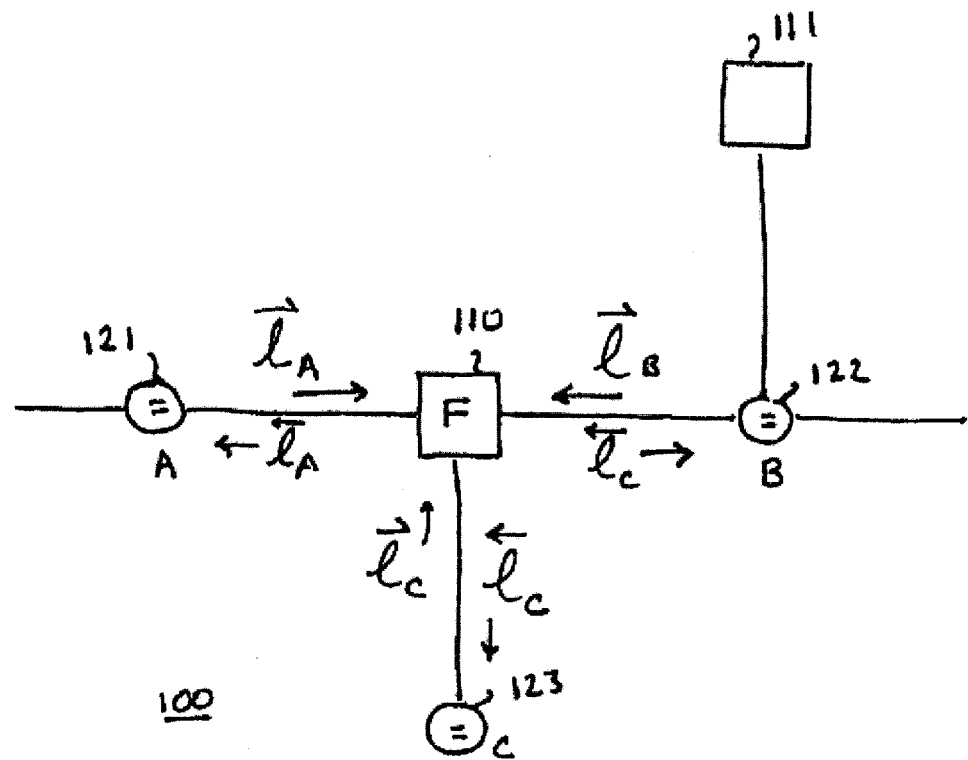
FIG. 1 is a portion of a factor graph.

In general, the host system 303 analyzes a problem graph (as shown in FIG. 1, element 250) and determines a sequence of computations which are necessary to compute the problem graph as well as necessary factor table records. The analysis can be accomplished, for example, by using an application programming interface (API) and a compiler designed specifically for the programmable probability engine 301. Based on the determined sequence of computations, the host system 303 transfers high level instructions into a RAM 326 along with the necessary factor table records if not already resident (e.g., from an earlier computation or from another prior configuration). The front end 324 reads the high level instructions from the RAM 326 using direct memory access (DMA) and provides them to the processing unit 310 via a host interface 312. The front end 324 also reads the factor table records from the RAM 326 and provides them to the processing unit 310 via the host interface 312.

The factor table records accepted from the host interface 312 are provided to the factor table memory 381. The high level instructions accepted from the host interface 312 are provided to the instruction memory 316 in the sequencer 314. The sequencer 314 fetches the high level instructions from the instruction memory 316 and parses them into micro-instructions which are provided to a local instruction sequencer associated with each of the N slices 320. In some embodiments, the local sequencer also provides memory addresses of records to the factor memory 318. The records at the provided memory addresses are fetched from the factor memory 318 and provided to the appropriate slice 320.

Collectively, the slices 320 perform belief propagation for one factor of a factor graph by performing message passing algorithms such as the Min-Sum, Sum-Product, and Mean-Field algorithms. In some examples, a single shared instruction sequencer 314 causes the slices 320 perform message passing algorithms while operating in lock step with one another, with each slice 320 operating on distinct data. In other examples, each slice 320 has its own instruction sequencer 314 along with its own instruction memory 316. In such a case, the slices 320 may operate more independently of each other, for example, synchronizing with each other for inter-slice communications. A detailed description of how a single slice 320 performs a message passing algorithm is presented below. The results produced by the slices 320 are provided to the host interface 312 which in turn provides the results to the host system 303 via the front end 324.

In some examples, the factor table memory 318 maintains a cache of records such that previously used records do not need to be reloaded from the host system 303. The cache of records can be maintained as long as adequate space exists in the factor table memory 318.

2.1 Slice Architecture

Figure 4:
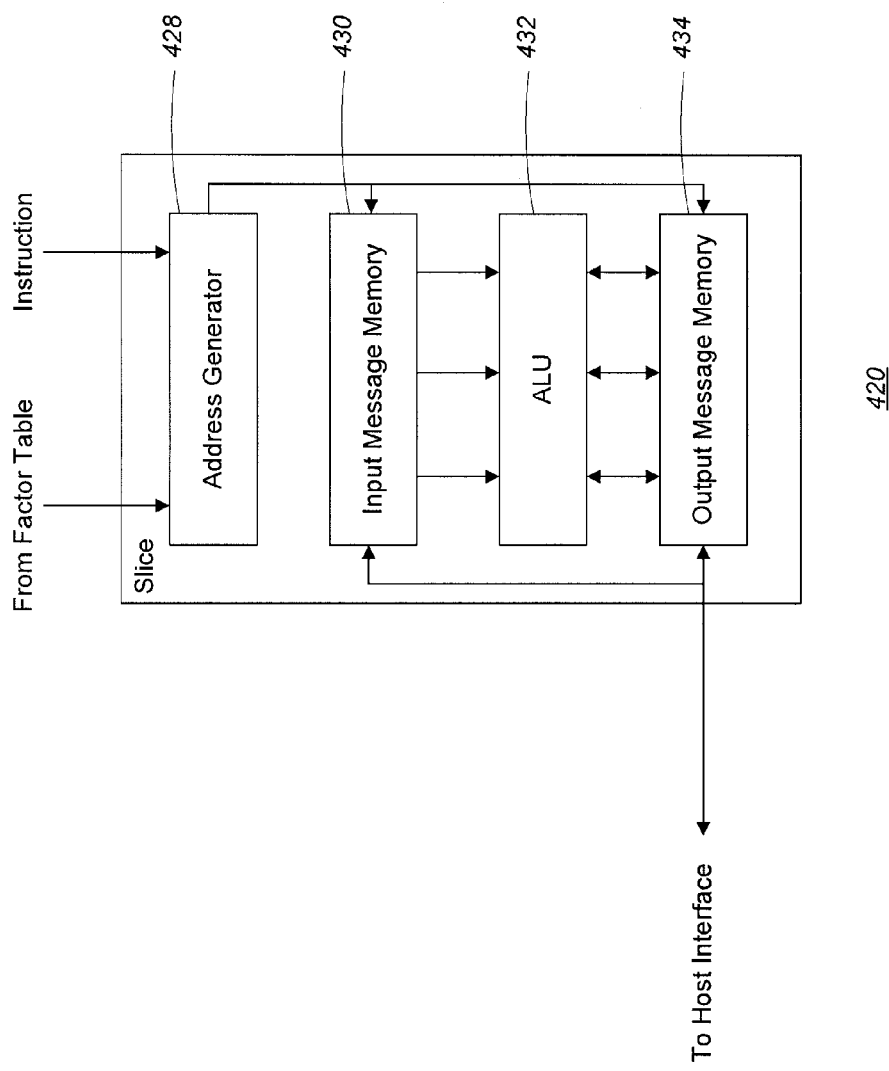
FIG. 4 is a detailed view of a slice.

Referring to FIG. 4, one example of an architecture of a single slice 420 is designed to compute the terms of message computations. The slice 420 includes an address generator 428, an input message memory 430, an ALU 432, and an output message memory 434.

In general, the slice 420 receives an instruction from the FIFO micro instruction queue (shown in FIG. 3, element 322) along with a record from the factor table memory (shown in FIG. 3, element 318). The address generator 428 provides a mapping between values in the factor memory 318 and locations in the input and output message memories 430, 434.

The input and output message memories 430, 434 store the inputs, intermediate values, and output of the computation of belief-propagations messages. Messages stored in the input message memory 430 are passed into the ALU 432 along with messages stored in the output message memory 434. The ALU 432 applies an algorithm (e.g., the Min-Sum algorithm) to the messages and produces a result which is stored in the output message memory 434. After performing a number of iterations of the message passing algorithm, the results stored in the output message memory 434 are passed back to the host system (shown in FIG. 3, element 303) through the host interface (shown in FIG. 3, element 312).

In some examples, the input and output message memories 430, 434 use digital logic. In other examples, the memories 430, 434 use store values in analog form.

Referring to FIG. 5, pseudocode is presented which implements an iterative message passing algorithm that solves for the factor F shown in FIG. 1. The pseudocode can be implemented by the detailed slice architecture shown in FIG. 6.

2.2 Detailed Slice Architecture

Figure 6:
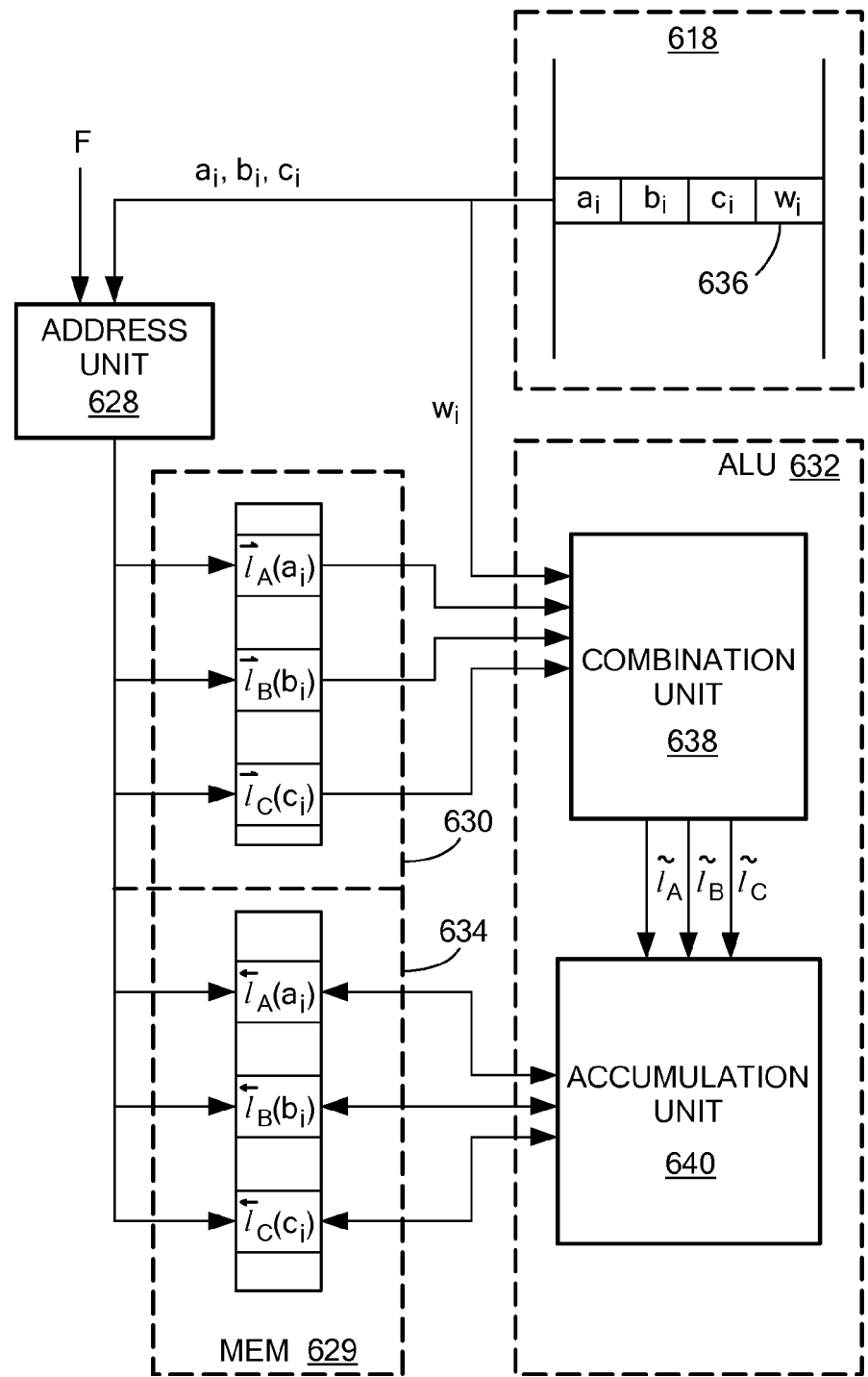
FIG. 6 is a block diagram of a computation unit.

Referring to FIG. 6, a detailed version of the slice architecture shown in FIG. 4 is shown along with the factor table memory 618. The slice architecture includes input and output message memories 630, 634, and an ALU 632. An address unit 628 provides a mapping between values in the factor table memory 618 and locations in the message memories 630, 634. Generally, the factor table memory 618 includes a set of records 636. Each record 636 corresponds to an iteration of the loop over i at lines 104-112 in the pseudocode. A sequencer or controller (not shown in FIG. 6) causes successive records 636 to be accessed from the factor table memory 618. For each record 636, a combination unit 638 of the ALU 632 performs the computations of lines 106-108 of the pseudocode, and an accumulation unit 640 performs the computations of lines 109-111 of the pseudocode. The address unit 628 maps each index into two corresponding memory locations in the message memory: an input message location and an output message location. For example, for the factor F shown in FIG. 1, the address unit 628 maps an index $a_i$ to the address addr($\vec{I}_A(a_i)$) for the input message and addr($\tilde{I}_A(a_i)$) for the output message (where addr( ) is understood to mean the address of the storage location for that message value). Note that the signal paths between the message memory 629 and the combination unit 638 are unidirectional from the memory to the combination unit 638, while the signal paths between the memory 629 and the accumulation unit 640 are bidirectional so that for each record 636 of the factor table memory 618, the current values of the output messages are read in, and the minimum of the read value and the newly computed value is written back. By iterating over all the elements $(a_i,b_i,c_i)$ of the factor, the three output messages are computed.

2.2.1 Arithmetic Logic Unit

Figure 7:
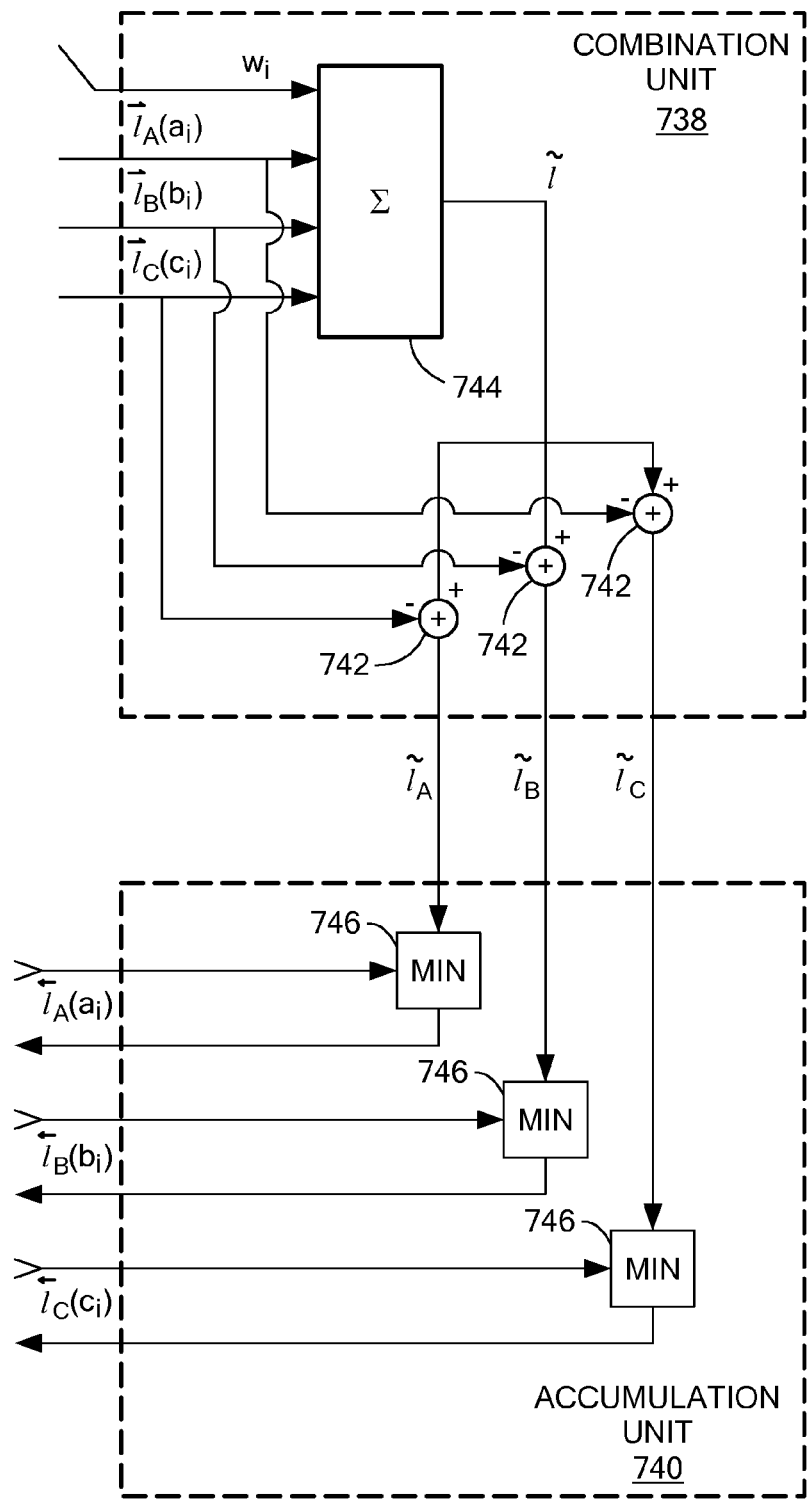
FIG. 7 is a block diagram of an ALU.

Referring to FIG. 7, an implementation of the ALU includes a summation unit 744, which accepts the input message values and the weight and outputs the sum of its inputs. Each of the weights is subtracted in a corresponding adder 742 so that each of the three outputs of the combination unit effectively excludes a corresponding message input. The accumulation unit makes use of three minimum units 746, each of which accepts the memory value and provides the minimum of the memory value and the corresponding newly computed value.

Figure 8:
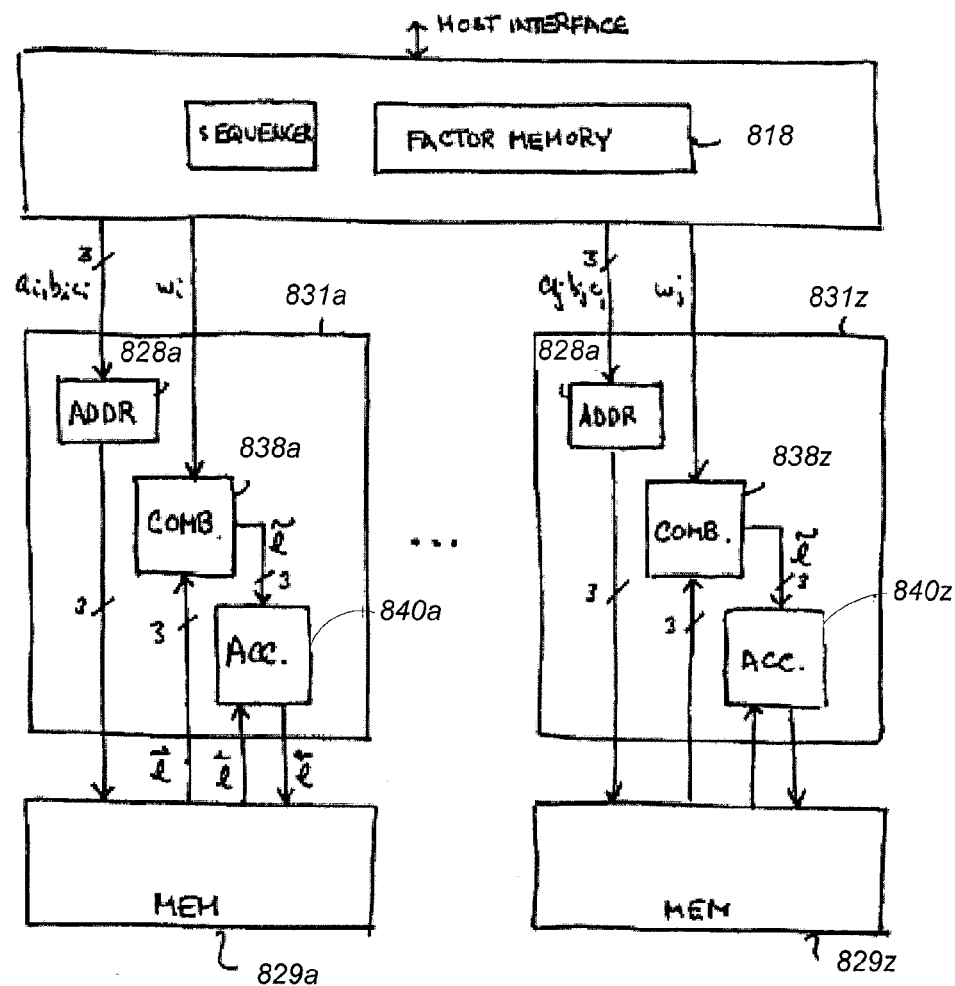
FIG. 8 is a diagram showing multiple ALUs in parallel.

Referring to FIG. 8, in some implementations, multiple ALUs are implemented and executed in parallel. For instance ALUs 831a-831z (i.e., two or more ALUs) each receive a part of (i.e., a disjoint exhaustive subset) the values $(a_i,b_i,c_i)$ for the factor. The input message values are replicated in each copy of the memory 829a-829z so that each ALU can perform a local read of the input message value. After all the elements of the factor are evaluated, the output messages are typically not fully computed. For example, for a particular entry $a_i$, separate partial computations of the output message $\tilde{I}_A(a_i)$ are present in the message memories 829a-z. In one implementation further data paths (not shown) link the accumulation units to the message memory so that in a sequence of iterations (e.g., $\log_2(n)$ where n is the number of ALUs), the absolute minimum is computed across the ALUs.

In some embodiments, a host system controls the operation of the system, including loading the factor memory 818, configuring the sequencer to coordinate operation of the ALUs and the address units, and loading an unloading message values from the message memory.

In some examples, the factor memory 818 does not necessarily hold an exhaustive set of tuples $(a_i,b_i,c_i,w_i)$. For example, a set of tuples $(a_i,b_i,c_i)$ for which a fixed known weight (e.g., 0.0) is encoded, and the sequencer is configured to convert the encoding to the sequence of $(a_i,b_i,c_i,w_i)$ tuples. Other forms of compressed representation of the factors may also be used.

In some examples, different inputs have different numbers of possible values, and therefore different numbers of bits may be needed to represent the indexes. As an example, a variable that can take on 16 values only requires at most 4 bits to represent each index, but a variable that can take on 1024 values may take 10 bits. Therefore, even with a maximum of three variables per record in the factor memory, different numbers of bits may be allocated for each index.

In the example above, the factor is assumed to have three inputs, which corresponds to the hardware architecture of the ALUs which expect three inputs and a weight. For a factor with only two inputs, one approach is to configure the combination unit to ignore one of the inputs, or alternatively for the message memory to provide an input (e.g., 0.0) that does not affect the combination.

Figure 9A:
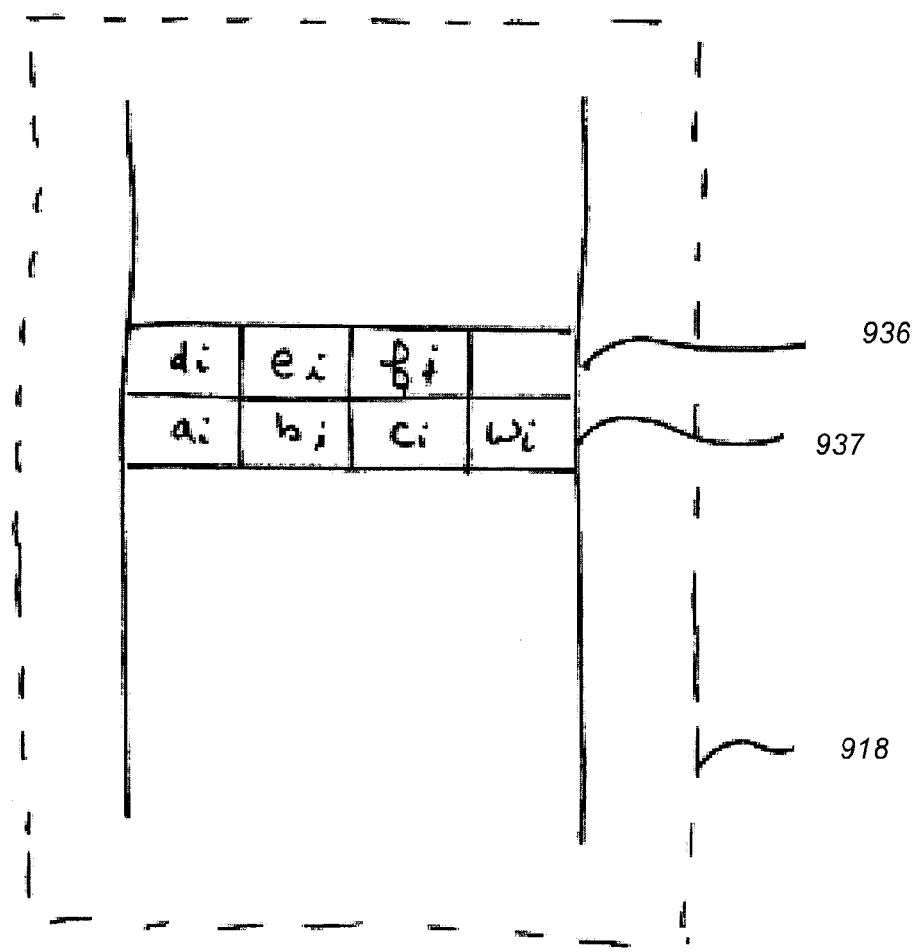
FIG. 9A is a diagram of a factor memory with multiple records per factor element.
Figure 9B:
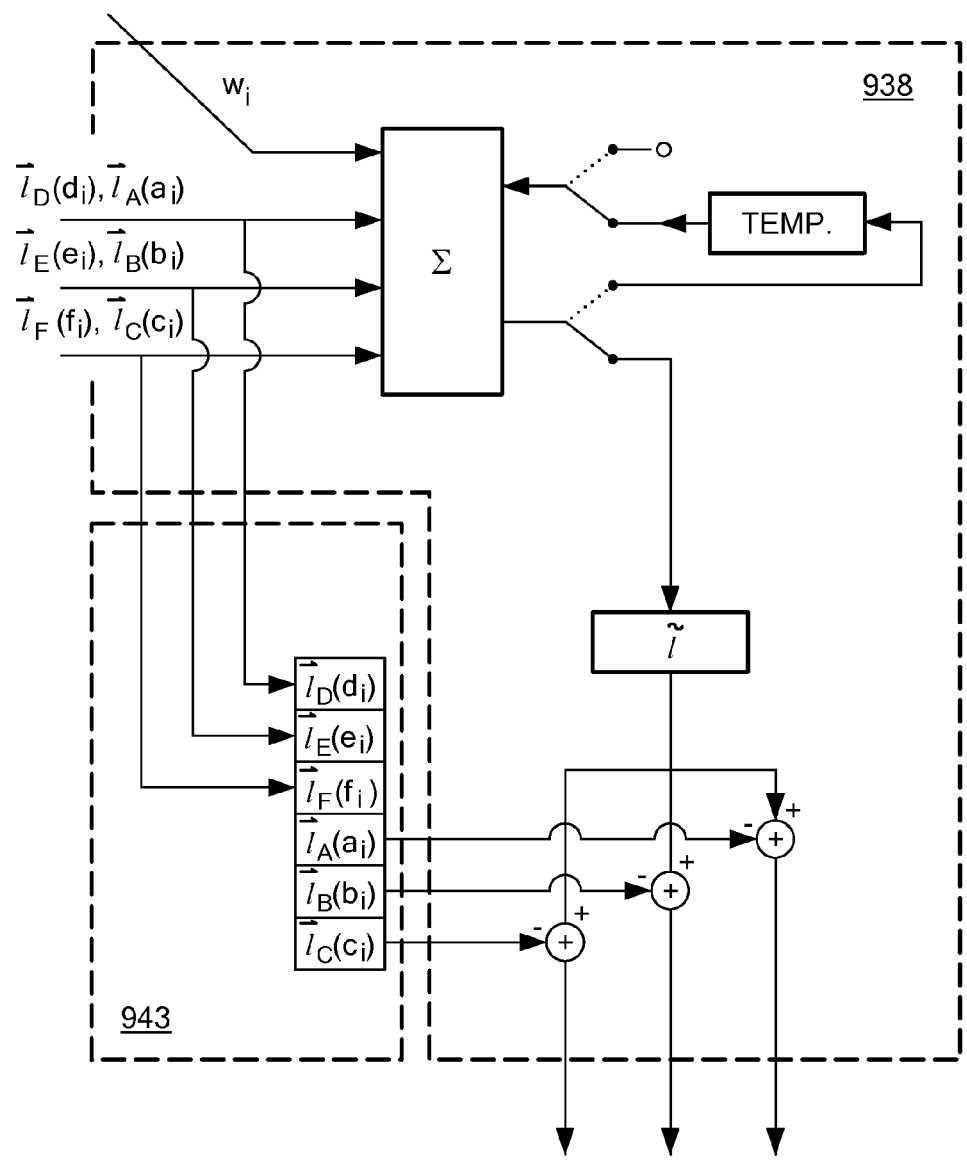
FIG. 9B is a block diagram of an iterative/pipelined ALU.

However when a factor has more inputs than the number for which the ALU is configured, one approach is to use an iterative and pipelined approach. For example, consider a factor that has six variables, and therefore each element of the factor is defined by a tuple $(a_i,b_i, \ldots, f_i,w_i)$. Referring to FIG. 9A, one approach is to encode such an element in a succession of records 936, 937 in the factor memory 918. Referring to FIG. 9B, operation of the combination unit 938 can be understood by considering the first cycle in which ($\vec{I}_A(a_i)$, $\vec{I}_B(b_i)$, $\vec{I}_C(c_i)$) are read from the message memory. These values are summed with the weight $w_i$ and stored (i.e., added to a zeroed value) in a temporary register. The input message values are added to a FIFO. On the second cycle, values ($\vec{I}_D(d_i)$, $\vec{I}_E(e_i)$, $\vec{I}_F(f_i)$) are read from the message memory. The values are then added to the value in the temporary register to yield the value $\vec{I}$ as defined in the single cycle case. The values ($\vec{I}_D(d_i)$, $\vec{I}_E(e_i)$, $\vec{I}_F(f_i)$) are pushed into the FIFO 943. In the second cycle, the values ($\vec{I}_A(a_i)$, $\vec{I}_B(b_i)$, $\vec{I}_C(c_i)$) are read from the output of the FIFO and subtracted from $\vec{I}$ to produce ($\tilde{I}_A, \tilde{I}_B, \tilde{I}_B$). On the third cycle the values ($\vec{I}_D(d_i)$, $\vec{I}_E(e_i)$, $\vec{I}_F(f_i)$) are read from the FIFO and the values ($\tilde{I}_D, \tilde{I}_E, \tilde{I}_F$) are output by the combination unit. Note that in the third cycle, values ($\vec{I}_A(a_{i+1})$, $\vec{I}_B(b_{i+1})$, $\vec{I}_C(c_{i+1})$) can be processed in a pipelined manner without affecting the outputs ($\tilde{I}_D, \tilde{I}_E, \tilde{I}_F$).

Operation of the accumulation unit is delayed so that in the second cycle, the output messages for $((a_i,b_i,c_i)$ are updated, and in the third cycle the output messages for $(d_i,e_i,f_i)$ are updated.

Note that this same approach can be used for situations in which more than two records per factor element. Generally, for M records per element, the accumulation unit is delayed by M−1 cycles in a pipelined manner.

3 Multiple Probability Processor Elements

In some examples, a control graph 280 can be a specification of another inference graph which is used to optimally determine how the inference graph 250 is computed by the processing unit 210.

Figure 10:
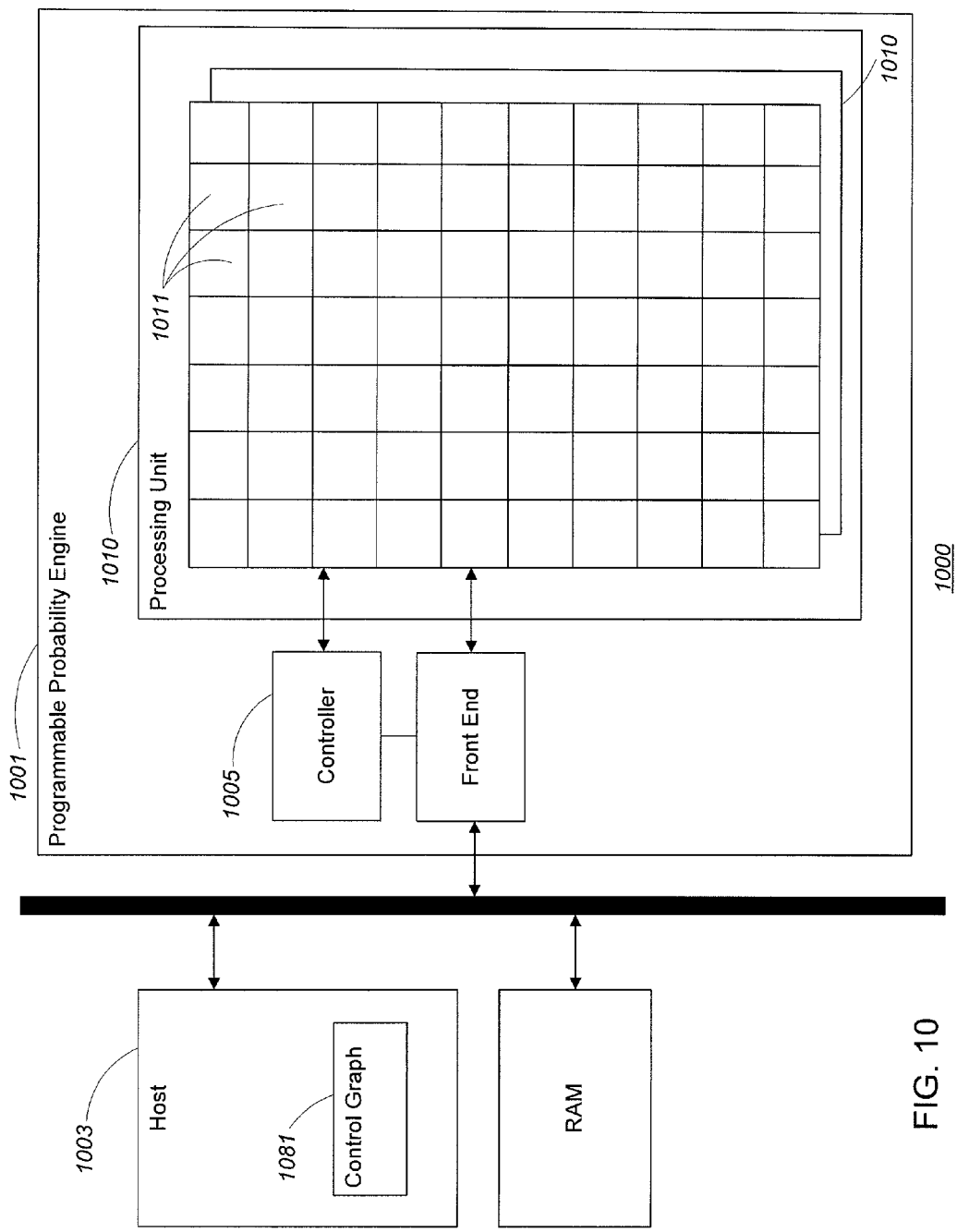
FIG. 10 is a system including multiple probability processor elements.

Referring to FIG. 10, in another embodiment of a reconfigurable processing system 1000, the architecture of the processing unit 1010 is extended to incorporate multiple probability processor elements 1011, with each probability processor element 1011 operating in parallel. The probability processor elements 1011 are connected via a reconfigurable connectivity fabric 1080 over which messages are passed between the data memories of individual probability processor elements 1011. When computing a graphical-model, the set of probability processor elements 1011 operates on a portion of the model at a time (assuming a large model). At any given time, each probability processor element 1011 performs the computation associated with one node in the graph. Each probability processor element 1011 can be used to perform the computation for a number of different nodes as different portions of the model are loaded into the programmable probability engine 1001.

3.1 Interconnect

The connectivity fabric 1080 is configured (e.g., by the host system 1003 or a controller 1005 located on the programmable probability engine 1001) to correspond directly to the structure of the graphical model. For example, in an image processing application, graphical models typically correspond to a two-dimensional grid, or perhaps a hierarchy of such grids. For this type of processing, the co ectivity fabric 1080 is configured to mimic this structure so that communication bet een probability processor elements 1011 corresponds directly to the communication be ween nodes in the graphical model required for message-passing based inference algorithms. Such a configuration allows for high-bandwidth parallel communication between the probability processor elements 1011 without bottlenecks.

Note that for a given connectivity structure, there may be many distinct inference problems that can be implemented. For example, a linear chain structure can be used to perform inference on a great many models in the form of a time-sequenced Markov model. Or, a hierarchy of two-dimensional grids can be used to perform inference for a wide variety of image processing models.

Some common configurations of the connectivity fabric 1080 are: butterfly network, fully connected, grids, chains, trees, fat trees etc. In some examples, the configurable interconnect plane 1080 includes storage for intermediate analog or digital values.

For some types of graphical models, the connectivity fabric may change frequently when operating on different portions of the graph. For other types of graphical models, such as those representing arrays of image pixels or hidden Markov models, the connectivity may not need to change when operating on different portions of the graph.

In some examples, the processors associated with nodes for which the connectivity changes must complete their processing task and synchronize their data prior to the reconfiguration of connectivity.

In some examples, due to the overhead of reconfiguring the connectivity fabric 980, it may be necessary to allow changes in connectivity to be preloaded while the previous computation is still underway, allowing a rapid switch to the new configuration.

In some examples, operation of the parallel probability processor elements 1011 is a mixture of asynchronous and synchronous operation. Thus, reconfiguration of the connectivity fabric 1080 needs to be synchronized. In particular, all processing elements 1011 involved with the portions of the connectivity fabric 1080 being modified need to reach an appropriate synchronization point before the reconfiguration can occur.

3.2 Tiled Probability Processor Element Architecture

Generally, the processing unit 1010 may have different sets of probability processor elements 1011, each with different characteristics most suited to different types or topologies of factor graphs. For example, one type of probability processor element 1011 may be best suited to graphs that are generally grid-like, while another type of probability processor element 1011 may be best suited for tree-like graphs. In some examples, certain of the probability processor elements 1011 may be particularly tailored to specific types of problems. An example of such a specific problem relates to LDPC decoding as described in the co-pending application international application number PCT/US11/20794 titled "BELIEF PROPAGATION PROCESSOR." In some examples, the probability processor elements 1011 use log-based representations and implement factor graph message passing. In some examples, certain of the probability processor elements 1011 may be implemented using digital logic, while others of the probability processor elements 1011 may be implemented using analog logic.

3.3 Execution Control

As is common in many parallel systems, it is desirable to ensure that each of the processing elements 1011 is optimally utilized. Controlling execution by scheduling, load balancing, and pipelining are ways in which such an optimization can be accomplished.

In some examples, an overall problem graph may have different parts or regions which are not necessarily addressed concurrently. In some such examples, the controller 1005 or host system 1003 follows a predetermined plan or schedule, for example, performing computation using a first part of a graph, and proceeding to another part of the graph only after an intermediate result is obtained. The sequence of iterations results in a convergence to an overall solution of the problem. For example, one part of a graph represent decoding constraints of an LDPC code, while another part of the graph may represent another form or constraint, for instance, based on inter-symbol interference not addressed by the code, and yet another part of the graph may related to adaptation of a channel model to be used in signal acquisition stage. The plan or schedule is then used to coordinate operation of the parts. In some examples, the control is implemented using programmable logic (e.g., a software program), which may involve numerical computations.

The type of schedule is chosen by the user and defined in the source code that specifies a graphical model (or a default schedule is used). Design software (e.g., DMPL software and compiler) combines the graphical model connectivity with a choice of schedule to indicate the specific order of processing. Since the processing unit 1010 allows parallel processing such that many nodes in the graph may be updated at once, instead of generating a single ordered sequence, the DMPL compiler can define a partially ordered sequence of updates, allowing as many updates as possible to be done in parallel. The choice of schedule type, under the control of the user, affects how much parallelism can be exploited.

For a given schedule, each processing operation must be mapped to a given probability processor element 1011 at a given time. This mapping is also a function of the DMPL compiler. The compiler incorporates knowledge of the number of probability processor elements 1011, the available configurations of the connectivity plane, the amount of local and shared storage, and other factors, to choose the mapping. The mapping determines the sequence of instructions provided to each probability processor element 1011, the sequence that these instructions, as well as the combo tables are preloaded onto the probability processor elements 1011, the necessary connectivity plane configuration changes, and the sequence in which data is transferred to and from the probability processor elements 1011. The mapping is explicitly aware of the caching that can be done, avoiding unnecessary transfers of data.

In some examples, efficiency can be improved by using dynamically updating schedules. For example, the host system 1003 or the controller 1005 may optimally select portions of the graph to assign to different probability processor elements 1011. Intermediate values computed for one portion of a graph can be used as indications of which portions of the graph should be solved next such that optimal progress is made toward the overall solution. In other examples, run-time decision making related to which parts of a graph to address during the course of execution is accomplished using a further graph-based computation which is performed by a controller 1005 located on the programmable probability engine 1001. For instance, a decision of which part of a graph to address may itself be represented as a Bayesian inference control problem 1081 which is assigned to the probability processor elements 1011 under the control of the controller 1005.

Another method for optimally utilizing the probability processor elements 1011 is balancing the computational load on each probability processor element 1011. For example, in an arbitrary factor graph there can be a large disparity in the computational complexity between various nodes. As a result, some probability processor elements 1011 may be given a number of factors with small computation required, while other factors may be given a single factor requiring a large computation. The host system can optimally assign factors to computation elements while taking into account the need to balance the load as much as possible.

Another method for optimizing the utilization of the probability processor elements 1011 is to allow the host system 1003 to treat the processing as a pipeline, where at any given time tasks are being fetched ahead of time, fed to the probability processor elements 1011, other tasks are being executed, and the results of already executed tasks are being read out.

Further details regarding one or more implementations of systems such as those described above are provided in the co-pending provisional application titled "PROGRAMMABLE PROBABILITY PROCESSING PLATFORM WITH RECONFIGURABLE CONNECTIVITY FABRIC."

3.4 Programming Language/Compiler

In some examples, inference graphs are specified using an application programming interface (API) referred to as DMPL. DMPL is used to design arbitrary graphical models by specifying variables of the model and the factors that relate the variables.

DMPL allows for the specification of the solver schedule which can be a pre-defined schedule (e.g., Sum-Product, Min-Sum, Gibbs sampling, etc.) or a custom, user-defined schedule.

Some pre-defined schedules are conditional on the topology of the inference graph. For example, a tree/sequential schedule examines each graph and sub-graph to determine which schedule to use for it. If the graph or sub-graph is a tree, then a tree schedule is used for that portion of the graph (the optimal schedule for a tree), otherwise a sequential schedule is used for that portion of the graph.

Once the inference graph is specified, DMPL compiles the factor graph such that the programmable probability engine 1001 can execute them. The output of the compiler includes control software for the host system 1003 and data/sequencing instructions for the programmable probability engine 1001.

4 Alternatives

While the above-described reconfigurable processing system architecture utilizes an external host processor to coordinate the programmable probability engine computation and to perform any additional processing beyond the capabilities of the programmable probability engine as currently defined, a more general architecture could include one or more general purpose processors, dedicated to the programmable probability engine. In addition, to simply performing more local coordination of the programmable probability engine's operation and reducing off-chip I/O, local general purpose processors can facilitate support for a broader class of inference algorithms. Some specific algorithms, and the means by which a general purpose processor can augment the computation by the probability processor elements, are described as follows.

In the examples described above, the host system is external to the programmable probability engine. However, in some examples, one or more CPUs may be integrated into the programmable probability engine, acting as an on-chip host system. Furthermore, in some examples, one host system can serve as a host to multiple programmable probability engines.

Particle belief propagation is a form of belief propagation that can be used to support continuous variables or variables with very large domains. In this case, instead of passing an entire probability distribution as a message, the messages are a series of values that represent the importance-weighted message at points randomly sampled from the domain of the variable. The belief propagation updates using these messages are similar to ordinary belief propagation, and as such could be performed using the programmable processor elements with little change. But there are additional aspects of what must be computed that could benefit from support by a general-purpose processor. Specifically, there are two such aspects of the computation. First is the periodic resampling of the randomly chosen sample points for each variable. This computation can involve repeated evaluation of functions that defines factors in the graph (for example, when resampling using the Metropolis-Hastings algorithm). For a user-specified factor-graph, these functions may be user specified and involve arbitrary computation. Second is the regeneration of the factor table after this resampling. One method of doing this is to recalculate the factor-table for a given factor by evaluating its factor function at the new sample points. This also may involve arbitrary user-specified computation. In both cases, a general purpose processor augmenting the probability processor elements can perform these computations. In one approach, these processors would perform resampling of variables and recalculation of factor tables, and then write the new factor table values into the factor-table memory of the appropriate probability processor element as needed. In one approach, this calculation is performed while a probability processor element continues to perform processing on portions of the factor graph.

Another class of algorithms that could benefit from general purpose computation are sampling-based methods. Common sampling methods are Gibbs sampling and the Metropolis-Hastings algorithm. Sampling based algorithms can be used to perform inference on a factor graph. Typically Gibbs sampling is used in this case (sometimes in combination with the Metropolis-Hastings algorithm). Sampling-based algorithms can also be used to perform inference on models specified by a stochastic generative program. In this case, the Metropolis-Hastings algorithm is used as one aspect of the inference computation. In the case of factor graphs using continuous or large-domain variables, and in the case of stochastic generative programs, inference computation includes performing arbitrary computation based on a user-specified program (either the factor function, in the former case, or the stochastic generative program itself, in the latter case). In both cases, general purpose processors as part of the programmable probability engine can be used to perform these computations. In some cases sampling based methods, such as for performing inference on stochastic generative programs, can be combined with belief propagation, such as performed by the probability processor elements as currently defined. Models that combine both generative programs and undirected graphical models (factor graphs) are possible, and in such cases, it would be appropriate to combine the two approaches, in which case the programmable probability engine belief-propagation computations could operate simultaneously with other computations used for other portions of the model.

Sampling based methods, particle belief propagation, as well as other forms of non-parametric belief propagation (particle belief-propagation is a form of non-parametric belief propagation), all involve random sampling for at least a portion of the computation. Random sampling generally requires mechanisms to generate random or pseudo-random numbers, distributed according to some set of distributions. To efficiently perform these types of computation, one form of probability processor engine would have dedicated hardware for generation of random numbers, or more generally for generating randomly distributed values according to a probability distribution selected among a set of available distributions. Hardware support for this could be a pseudo-random bit-sequence generator, a random bit-sequence generator (based on a form of physical randomness), or could involve direct generation of values from a distribution. Hardware support for uniform distributions, normal distributions, or exponential distributions would facilitate efficient implementation of these algorithms.

For the programmable probability engine including multiple analog processor elements, an alternative embodiment includes direct support for Gaussian messages (parameterized by a mean and variance [or equivalent], or by a joint mean and covariance matrix [or equivalent]). It may also support messages based on mixtures of Gaussians (messages parameterized by a series of Gaussian messages combined with a mixture weight associated with each). It may also support other parameterized message representations. In the case of Gaussian messages, it may support special-purpose processing for Gaussian or linear factors and for variable nodes (linear factors include sum or difference factors, and multiplication by a constant scalar or matrix). For supporting more general factors that are not as easily computed, the programmable probability engine can employ stochastic methods for performing the factor computation. Graphs with such factors would make use of mechanisms similar to those described above for sampling based algorithms, while Gaussian factors, linear factors, and variables, would make use of special-purpose hardware in the probability processor elements.

In the above description some examples of probability processor elements are described as being implemented using analog electronics or a combination of analog and digital logic. However, in some examples, the probability processor elements can be implemented using digital electronics. In an Analog Logic implementation of programmable probability engine, Min-Sum or Sum-Product computations performed by each probability processor element use Analog Logic computation elements. In a digital implementation, this processing uses digital computation elements.

In some examples, the programmable probability engine includes a shared memory for storing factor tables which are shared among a large number of the parallel probability processor elements. In many cases many nodes in a graphical model may use the same factor function. If the associated combination table is sufficiently large, then it would be inefficient to independently store a copy of the table in the local memory of each probability processor element. In this case, it is proposed that a shared memory be available to hold such tables. In operation, all of the probability processor elements making use of a given table in shared memory would be configured to operate in synchrony during the time this table is in use. This allows the data from the table to be read over a shared memory bus and used simultaneously by all probability processor elements that require its value.

The specialized programmable probability engine compiler is responsible for determining the criteria by which shared memory is used to store combo tables. It balances the overall storage requirements with any performance tradeoff associated with reading shared memory or synchronizing probability processor elements. For example, if multiple tables are stored in shared memory that are to be used at the same time by different subsets of probability processor elements, there can be some performance degradation due to contention for the shared memory bus.

In embodiments where at least part of the probability processing engine is implemented using analog electronics, data is converted between digital and analog form. In some examples, a DMA controller included in the front end incorporates a data conversion unit that can translate data between the analog and digital domains. Specifically, the DMA controller can incorporate a bank of DACs for translating data from the digital to the analog domain, and a bank of ADCs for translating data from the analog to the digital domain.

In some examples, each probability processor element includes local operating memory which is maintained by a memory hierarchy scheme, allowing for storage of data at several levels.

The internal representation of messages can be a logarithmic representation of probability; either a log-likelihood ratio (LLR) for binary variables or a potential (log p) for multi-valued variables. By default the corresponding representation of this data for external storage is in the same format. A representation conversion step may also be included to allow representation in other formats.

It is to be understood that the foregoing description is intended to illustrate and not to limit the scope of the invention, which is defined by the scope of the appended claims. Other embodiments are within the scope of the following claims.

What is claimed is:

1. A computation device for performing an inference task specified by a plurality of variables and a plurality of factors, the device comprising:

a plurality of processing elements operable in parallel; and a controller having an interface for a host system for accepting a specification of at least part of the inference task, wherein one of the processing elements is configurable by the controller to perform a computation associated with one of the factors concurrently with other of the processing elements performing computation associated with different ones of the factors; and the one of the processing elements includes
- a first storage for a definition of a plurality of input message values based on a factor associated with a subset of the variables,
- a second storage, and
- one or more arithmetic logic units including
  - a combination unit configured to receive the plurality of input message values, to receive a weight, and to compute a sum of the input message values and the weight to produce an output, and
  - an accumulation unit configured to determine whether the output is less than a predetermined value and to store the output in the second storage, if the output is less than the predetermined value.

2. The device of claim 1, wherein the specification of the inference task comprises a specification of a graph-based inference task, and each factor is associated with an element of a graph.

3. The device of claim 2, further comprising:
a connectivity system configurable by the host system or the controller to provide connectivity between processing elements according to the graph.

4. The device of claim 1, further comprising:
a connectivity system that provides at least one of a grid, a tree, and a chain connectivity between the processing elements.

5. The device of claim 1, wherein the combination unit comprises numeric computation logic.

6. The device of claim 1, wherein the combination unit comprises analog computation circuitry.

7. The device of claim 1, wherein the accumulation unit accumulates an output of the combination unit into values in said second storage.

8. The device of claim 1, wherein each processing element comprises a plurality of arithmetic logic units.

9. The device of claim 8, wherein the first storage is shared by the arithmetic logic units.

10. A method for performing an inference task using a computation device having a plurality of processing elements operable in parallel, the method comprising:
accepting at the device a specification of at least part of the inference task, the specification characterizing a plurality of variables and a plurality of factors;
configuring one of the processing elements with data defining a plurality of input message values based on one or more of the plurality of factors associated with a subset of the variables, wherein one of the processing elements comprises a first storage for the data, and a second storage;
at the one of the processing elements, performing computation associated with one of the factors concurrently with other of the processing elements performing computation associated with different ones of the factors, wherein the one of the processing elements includes one or more arithmetic logic units; and
using a combination unit in the arithmetic logic units configured to receive the plurality of input message values, to receive a weight, and to compute a sum of the input message values and the weight to produce an output, and an accumulation unit configured to determine whether the output is less than a predetermined value and to store the output in the second storage, if the output is less than the predetermined value.

11. The method of claim 10, further comprising:
accepting said specification from a host at a controller of the device; and
passing a result of performing the at least part of the inference task via the controller to the host.

12. The method of claim 10, wherein the specification of the inference task comprises specification of a graph-based inference task, and each factor is associated with an element of a graph.

13. The method of claim 12, wherein the inference task comprises a Belief Propagation task.

14. The method of claim 10, wherein the messages represent probability distributions of the variables.

15. The method of claim 12, further comprising:
configuring a connectivity system to provide connectivity between processing elements according to the graph.

16. The method of claim 10, further comprising:
configuring a connectivity system according to a result of a computation performed using the device.

17. The method of claim 10, further comprising:
providing at least one of a grid, a tree, and a chain connectivity between the processing elements via a connectivity system.

18. The method of claim 10, wherein each arithmetic logic unit comprises a combination unit, and performing the computation associated with one of the factors includes combining values accessed from the second storage.

19. The method of claim 10, wherein the combination unit comprises numeric computation logic used in computing the sum.

20. The method of claim 10, wherein the combination unit comprises analog computation circuitry used in computing the sum.

21. The method of claim 10, wherein each arithmetic logic unit further comprises an accumulation unit, and performing the computation associated with one of the factors includes accumulating an output of the combination unit into values in the second storage.

22. The method of claim 18, wherein each processing element comprises a plurality of the arithmetic logic units, and performing the computation associated with one of the factors includes performing a succession of parts of the computation concurrently on multiple of the arithmetic logic units.

23. An apparatus for solving inference problems, said apparatus comprising:
a probability processing platform having a plurality of processing elements configured to operate in parallel to perform computations, wherein
one of the plurality of processing elements includes
- a first storage for a definition of a plurality of input message values based on a factor associated with a subset of variables of an inference problem to be solved;
- a second storage; and
- an arithmetic logic unit including
  - a combination unit configured to receive the plurality of input message values, to receive a weight, and to compute a sum of the input message values and the weight to produce an output, and an accumulation unit configured to determine whether the output is less than a predetermined value and to store the output in the second storage, if the output is less than the predetermined value.

24. A method of solving inference problems, comprising:
solving an inference problem on a probability processing platform having a plurality of processing elements configured to operate in parallel, wherein
one of the plurality of processing elements includes
a first storage for a definition of a plurality of input message values based on a factor associated with a subset of variables of the inference problem to be solved;
a second storage; and
an arithmetic logic unit including
a combination unit configured to receive the plurality of input message values, to receive a weight, and to compute a sum of the input message values and the weight to produce an output, and
an accumulation unit configured to determine whether the output is less than a predetermined value and to store the output in the second storage, if the output is less than the predetermined value.

25. The apparatus of claim 23, further comprising:
a connectivity fabric that includes storage for intermediate analog or digital values.

26. The method of claim 24, wherein a connectivity fabric is reconfigured only after the processing elements involved with connectivity changes have completed respective processing tasks and synchronized respective data.

* * * * *